(12) United States Patent
Jeong

(10) Patent No.: US 8,116,725 B2
(45) Date of Patent: Feb. 14, 2012

(54) GPS-ENABLED MOBILE TERMINAL AND CURRENT POSITION LOCATING METHOD THEREOF

(75) Inventor: Chang Ki Jeong, Gumi-si (KR)

(73) Assignee: Samsung Electronics Co., Ltd., Maetan-Dong, Yeongtong-Gu Suwon-Si, Gyeonggi-Do (KR)

( * ) Notice: Subject to any disclaimer, the term of this patent is extended or adjusted under 35 U.S.C. 154(b) by 274 days.

(21) Appl. No.: 12/582,060

(22) Filed: Oct. 20, 2009

(65) Prior Publication Data

US 2010/0099377 A1    Apr. 22, 2010

(30) Foreign Application Priority Data

Oct. 21, 2008    (KR) .................. 10-2008-0102959

(51) Int. Cl.
*H04M 11/04* (2006.01)
(52) U.S. Cl. .................. 455/404.2; 455/436; 455/456.1; 455/574; 455/127.5
(58) Field of Classification Search .... 455/404.1–404.2, 455/414.1–414.4, 456.1–456.6, 457, 574, 455/343.1, 343.5
See application file for complete search history.

(56) References Cited

U.S. PATENT DOCUMENTS 6,121,921 A * 9/2000 Ishigaki .................. 342/357.74
2003/0119527 A1 * 6/2003 Labun et al. .................. 455/456
2006/0276168 A1 * 12/2006 Fuller et al. ................ 455/404.2
2008/0119182 A1 * 5/2008 Kwun et al. .................. 455/424
2009/0098880 A1 * 4/2009 Lindquist .................. 455/456.1

FOREIGN PATENT DOCUMENTS

| KR | 2003-46656 | 6/2003 |
| KR | 2005-73724 | 7/2005 |
| KR | 2007-34273 | 3/2007 |

\* cited by examiner

*Primary Examiner* — Marivelisse Santiago Cordero
*Assistant Examiner* — Dung Hong
(74) *Attorney, Agent, or Firm* — Cha & Reiter, LLC

(57) ABSTRACT

A Global Positioning System (GPS)-enabled mobile terminal and current position location method thereof acquires current position information of the mobile terminal while reducing power consumption of conventional mobile terminals with GPS capability. A method for locating position of a mobile terminal having a GPS reception unit includes storing a current position information of the mobile terminal which is acquired from GPS data received by the GPS reception unit; switching off the GPS reception unit after acquiring the GPS data; storing a base station information received from a first base station to which the mobile terminal is connected with starting a first timer. In the case where handover to a second base station is detected, a second timer is started. In the case where an expiration of the second timer is detected, switching on/activating the GPS reception unit to update the current position information; and initializing the first timer simultaneously with the expiration of the second timer.

14 Claims, 3 Drawing Sheets

GPS-ENABLED MOBILE TERMINAL AND CURRENT POSITION LOCATING METHOD THEREOF

CLAIM OF PRIORITY

This application claims priority from an application entitled "GPS-ENABLED MOBILE TERMINAL AND CURRENT POSITION LOCATING METHOD THEREOF" filed in the Korean Intellectual Property Office on Oct. 21, 2008 and assigned Serial No. 10-2008-0102959, the contents of which are incorporated herein by reference in its entirety.

BACKGROUND OF THE INVENTION

1. Field of the Invention

The present invention relates to a mobile terminal for radio communication. More particularly, the present invention relates to a GPS-enabled mobile terminal and current position location method thereof for quickly acquiring current position of the mobile terminal quickly while reducing power consumption.

2. Description of the Related Art

Global Positioning System (GPS) is a satellite-based positioning system that is operational in every part of the Earth. Recently, the integration of a GPS receiver into a mobile terminal is becoming increasingly popular. A GPS-enabled mobile terminal can determine its position using the GPS data received from at least three GPS satellites. The GPS-enabled mobile terminal can be configured to send the location information obtained by using the GPS data to a designated mobile terminal periodically by means of a message. Also, the GPS data is included in the SOS message that is transmitted to a preset phone number when an SOS button is pushed on the mobile terminal supporting an SOS function. Not only does such functionality benefit the individual user, because businesses are now starting to monitor employment movement in field offices by GPS, and having an employees portable terminal relay such information back to a monitoring station is improving efficiency of operations.

The GPS receiver of the mobile terminal can be set to operate in continuous running mode in which the GPS receiver runs continuously or in a discontinuous running mode in which the GPS receiver is activated when position location is required. In the continuous running mode, the GPS receiver consumes power continuously, but disadvantageously causes the battery of the mobile terminal to be discharged quickly. On the other hand, the discontinuous running mode is advantageous in terms of power consumption but disadvantageously causes a delay for locating the current position of the mobile terminal. The position locating delay of the discontinuous running mode can cause a significant problem in the case of an emergency. In fact, if something happens to the person carrying the portable terminal, that, for example, that causes the portable terminal to be exposed to, for example, water, the last reported location in an emergency could be sufficiently different from the current location to create a serious problem in locating the individual.

SUMMARY OF THE INVENTION

The present invention provides a GPS-enabled mobile terminal and current position locating method thereof that is quickly acquires a current position of the mobile terminal while reducing power consumption of the mobile terminal by efficiently controlling the operation of a GPS reception unit.

In accordance with an exemplary embodiment of the present invention, a method for locating position of a mobile terminal having a Global Positioning System (GPS) reception unit preferably includes storing a current position information of the mobile terminal which is acquired from GPS data received by the GPS reception unit; switching off the GPS reception unit after acquiring the GPS data; storing a base station information received from a first base station to which the mobile terminal is connected with starting a first timer; starting, when a handover to a second base station is detected, a second timer; switching, when an expiry of the second timer is detected, on the GPS reception unit to update the current position information; and initializing the first timer simultaneously with the expiry of the second timer.

In accordance with another exemplary embodiment of the present invention, a mobile terminal preferably includes a Global Positioning System (GPS) reception unit which receives GPS data to acquire a current position information of the mobile terminal; a first timer which switches on the GPS reception unit periodically to update the current position information of the mobile terminal; a second timer which starts when a handover of the mobile terminal is detected; a radio frequency unit which receives a base station information from a base station to which the mobile terminal is connected; and a control unit which calculates the current position information from the GPS data received by means of the GPS reception unit, checks the base station information received by means of the radio frequency unit, initializes the first timer periodically, starts the second timer when a handover is detected, and switches on the GPS reception unit to update the current position information of the mobile terminal and initializes the first timer when the second timer expires.

BRIEF DESCRIPTION OF THE DRAWINGS

The above and other exemplary objects, features and advantages of the present invention will become more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the appreciation of the subject matter of the present invention by a person of ordinary skill in the art.

Figure 1:
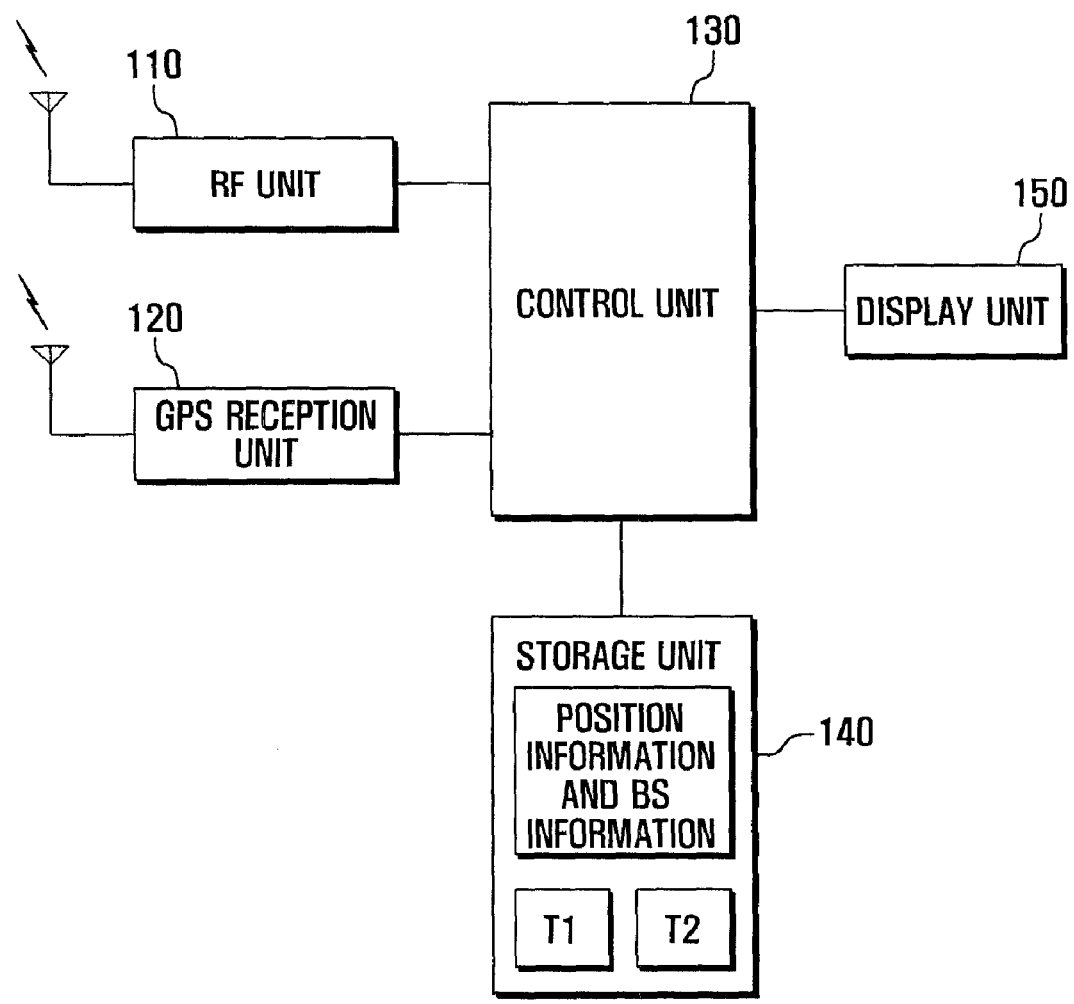
FIG. 1 is a block diagram illustrating a preferable configuration of a GPS-enabled mobile terminal according to an exemplary embodiment of the present invention.

FIG. 1 is a block diagram illustrating a preferable configuration of a GPS-enabled mobile terminal according to an exemplary embodiment of the present invention.

Referring to FIG. 1, the mobile terminal may include a Radio Frequency (RF) unit 110, a GPS reception unit 120, a control unit 130, a storage unit 140, and a display unit 150.

The RF unit 110 is responsible for radio communication of the mobile terminal with a base station. The RF unit 110 includes a duplexer for splitting transmission and reception, a transmitter for up-converting the transmission signal, and a receiver for down-converting the received signal. Particularly, the RF unit 110 enables the mobile terminal to exchange control signals with the base station for negotiating capability. The RF unit can operate under any known protocol used by mobile terminals to communication with the base station. The control signals can include round trip time, signal loss rate, and information on the service base station.

The GPS reception unit 120 receives GPS data from at least three GPS satellites. The GPS reception unit 120 outputs the GPS data to the control unit 130 for calculating the current location of the mobile terminal. A trilateration measurement is one of methods to calculate the current location of the mobile terminal using GPS data. The trilateration measurement is the method for determining a position of an object using a location of the GPS satellites included at the GPS data and the distances from the satellites calculated based on the locations of the satellites and timing differences of transmissions and receptions of the signals transmitted by the satellites. The current location of the mobile terminal can be expressed by a list of coordinates in latitude, longitude, and altitude.

The control unit 130 controls operations of the internal function blocks of the mobile terminal. Particularly when a GPS application is requested to be enabled, the control unit 130 switches on the GPS reception unit 120. Once the GPS reception unit 120 starts running, the control unit 130 can obtain GPS data output by the GPS reception unit 120 and calculates the current location of the mobile terminal using the GPS data. The control unit 130 also can acquire the information about the serving base station in accordance with a signal strength received by means of the RF unit 110. Once the location information and the base station information are checked, the control unit 130 switches off the GPS reception unit 120 and calculates its current position using a preset timer and the location and base station information.

In more detail, if a current location is requested by means of a menu selection or a function key input, the control unit 120 switches on the GPS reception unit 120 to check the location information and receives the base station information from the serving base station by means of the RF unit 110. At this time, the control unit 130 stores the location information checked by means of the GPS reception unit 120 and the base station information acquired by means of the RF unit 110 within the storage unit 140. The base station information is of the base station having a radio coverage in which the mobile terminal is located. Next, the control unit 130 switches off the GPS reception unit 120 and starts a first timer T1. The first timer T1 is preferably provided for switching on the GPS reception unit 120 periodically, and the periodicity of the first timer T1 can be set by the user or fixed at the manufacturing stage of the mobile terminal. In order to simplify the explanation, the serving base station is called a first base station and a base station to which the mobile terminal hands off is called a second base station.

After starting the first time T1, the control unit 130 measures the received signal strength of the first base station by means of the RF unit 110 and determines whether to make a handover to the second base station based on the received signal strength. If the determination is to make the handover to the second base station, the control unit 130 starts a second timer T2 at the time when the mobile terminal connects to the second base station.

The determination as whether or not to handover can be decided based on the Round Trip Time (RTT) of packet between the mobile terminal and the base station or the total Received Signal Code Power (RSCP). The RTT means the time taken for the mobile terminal to transmit a packet to the base station and receive it back, and the total RSCP means the sum of signal received code powers on the measured channel.

The second timer T2 is used to determine a handover hysteresis, i.e. determine whether the mobile terminal performs a handover back to the first base station prior to expiration of the second timer T2. The second timer T2 can be set by the user or fixed at the manufacturing station of the mobile terminal and is preferably set to a value less than the first timer T1.

If the mobile terminal performs a handover back to the first base station prior to expiration of the second timer T2, the control unit 130 determines whether the first timer T1 has expired. If the first timer T1 has expired, the control unit 130 switches on the GPS reception unit 120 to update the current position of the mobile terminal and stores the current position information within the storage unit 140. At this time, the base station information of the first base station is maintained within the storage unit 140.

Otherwise, if the mobile terminal does not perform a handover back to the first base station before the expiry of the second timer T2, i.e. if the handover to the second base station is successfully made without hysteresis, the control unit 130 switches on the GPS reception unit 120 to update the current position information of the mobile terminal regardless of whether or not the first timer T1 has expired. Next, the mobile terminal acquires the base station information from the second base station by means of the RF unit 110 and stores the current position information of the mobile terminal and the base station information of the second base station within the storage unit 140. After the update of the current position information and the base station information, the control unit 130 initializes the first timer T1. In this manner, the current position information of the mobile terminal is updated periodically and when a handover event occurs, i.e. when the service base station is changed.

For instance, assuming that the first timer T1 is set to one hour and the second timer T2 is set to 20 minutes, the control unit 130 controls, at the time when the first timer T1 has expired, the GPS reception unit 120 to switch on to check current position information of the mobile terminal and controls the RF unit 110 to receive the base station information from the first base station. Once the current location information and the base station information are successfully checked, the control unit 130 stores both the current location information and base station information within the storage unit 140 and initializes the first timer T1. While the first timer T1 is running, the control unit 130 monitors to detect whether or not a handover from the first base station to the second base station is made. If a handover from the first base station to the second base station is detected, the control unit 130 starts the second timer T2. While the second timer T2 is running, the control unit 130 determines whether or not a handover hysteresis occurs (handover back to the previous base station). The occurrence of the hysteresis is determined by comparing the currently received base station information and the previously stored base station information. If the current base station information received prior to expiration of the second timer T2 is identical with the previously stored base station information, the control unit 130 determines the occurrence of the handover hysteresis, i.e. that the mobile terminal has made a handover back to the first base station.

If no handover hysteresis is detected (i.e. if the mobile terminal does not make a handover back to the first base station in the 20 minutes that the second timer T2 is operating after the handover to the second base station), the control unit 130 switches on the GPS reception unit 120 immediately regardless of whether or not the first timer T1 has expired, in order to acquire the current position information of the mobile terminal. Once the current position information is successfully checked, the control unit 130 updates the current position information stored in the storage unit 140 to the newly received current position information. At this time, the control unit 130 also updates the base station information to the new base station information received from the second base station. Once the current position information and the base station information are updated successfully, the control unit 130 initializes the first timer T1.

Otherwise, if a handover hysteresis is detected (i.e. if the mobile terminal makes a handover back to the first base station in the 20 minutes of the second timer T2 after the handover to the second base station); the control unit 130 determines whether the first timer T1 has expired. If the first timer T1 has expired, the control unit 130 switches on the GPS reception unit 120 to check the current position information of the mobile terminal. Next, the control unit 130 updates the previously stored position information to the newly checked current position information and initializes the timer T1.

At this time, the storage unit 140 stores application programs running in the mobile terminal and application data generated while the application programs are running. Particularly in an exemplary embodiment of the present invention, the storage unit 140 preferably stores the current position information received by means of the GPS reception unit 120 and the base station information received by means of the RF unit 110. The storage unit 140 also stores the values of the first and second timers T1 and T2. Here, the first timer T1 is a timer for switching on the GPS reception unit 120 periodically, and the second timer T2 is a timer for determining a handover hysteresis after the mobile terminal first has made a handover.

The display unit 150 displays operation status and menus of the mobile terminal. The display unit 150 can be implemented, for example, with a Liquid Crystal Display (LCD). In case that the LCD panel of the display unit 150 supports touchscreen functionality, the display unit 150 may also operate as an input unit. The display unit 150 can be configured to display the current position information of the mobile terminal periodically under the control of the control unit 130. The current position information of the mobile terminal can be displayed, for example, on a geographical map having a public address system. In case that the mobile terminal is configured such that the current position information is transmitted to a designated phone number, the display unit 150 can be configured to display an alert message notifying the transmission of the current position information in the form of a popup window under the control of the control unit 130.

Although not depicted in FIG. 1, the mobile terminal can further include various types of function blocks such as a camera unit for taking pictures and a Digital Multimedia Broadcasting (DMB) reception unit for receiving DMB data.

A position locating method for the above structured mobile terminal is now described with reference to FIGS. 2 and 3.

Figure 2:
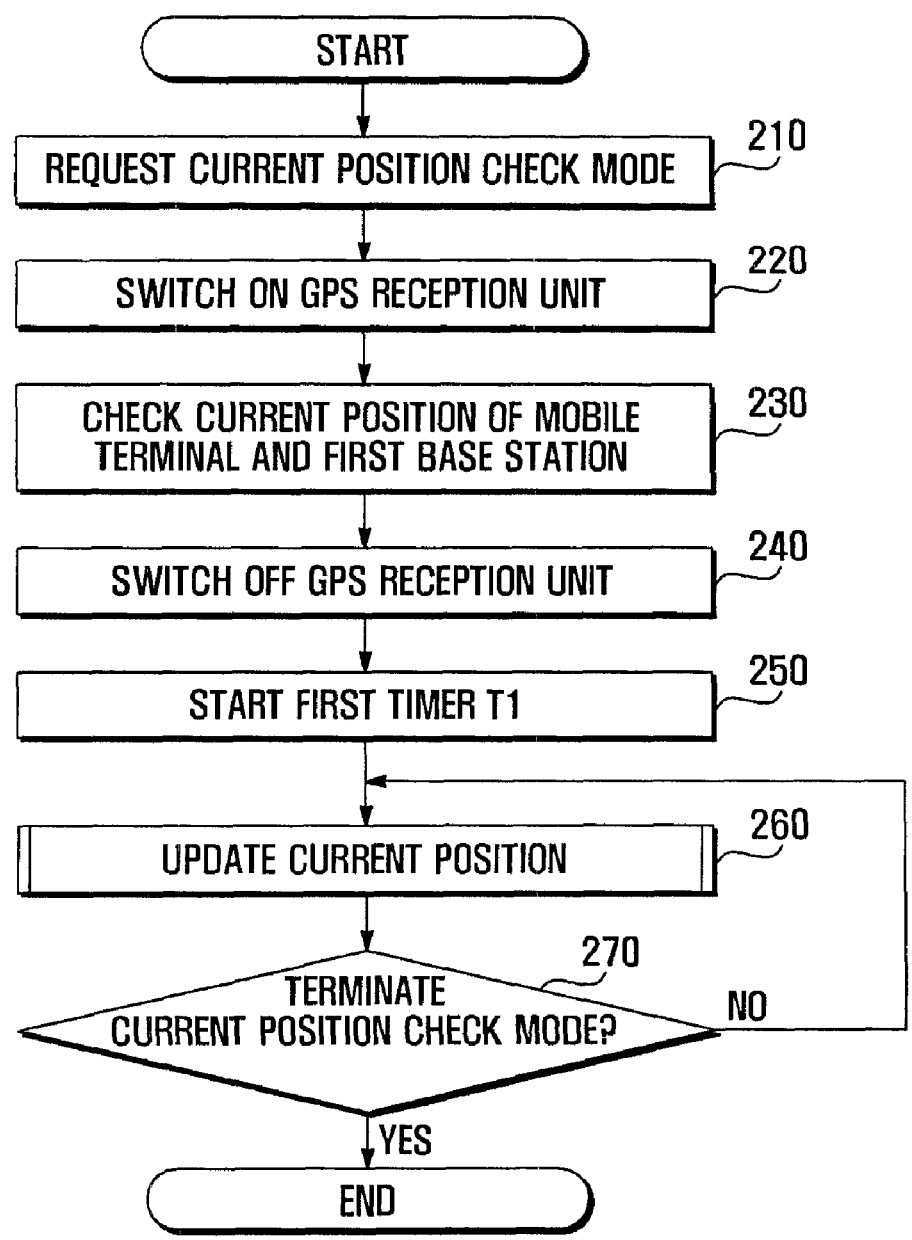
FIG. 2 is a flowchart illustrating exemplary operational steps of a current position locating method for a mobile terminal having a GPS reception unit according to an exemplary embodiment of the present invention.
Figure 3:
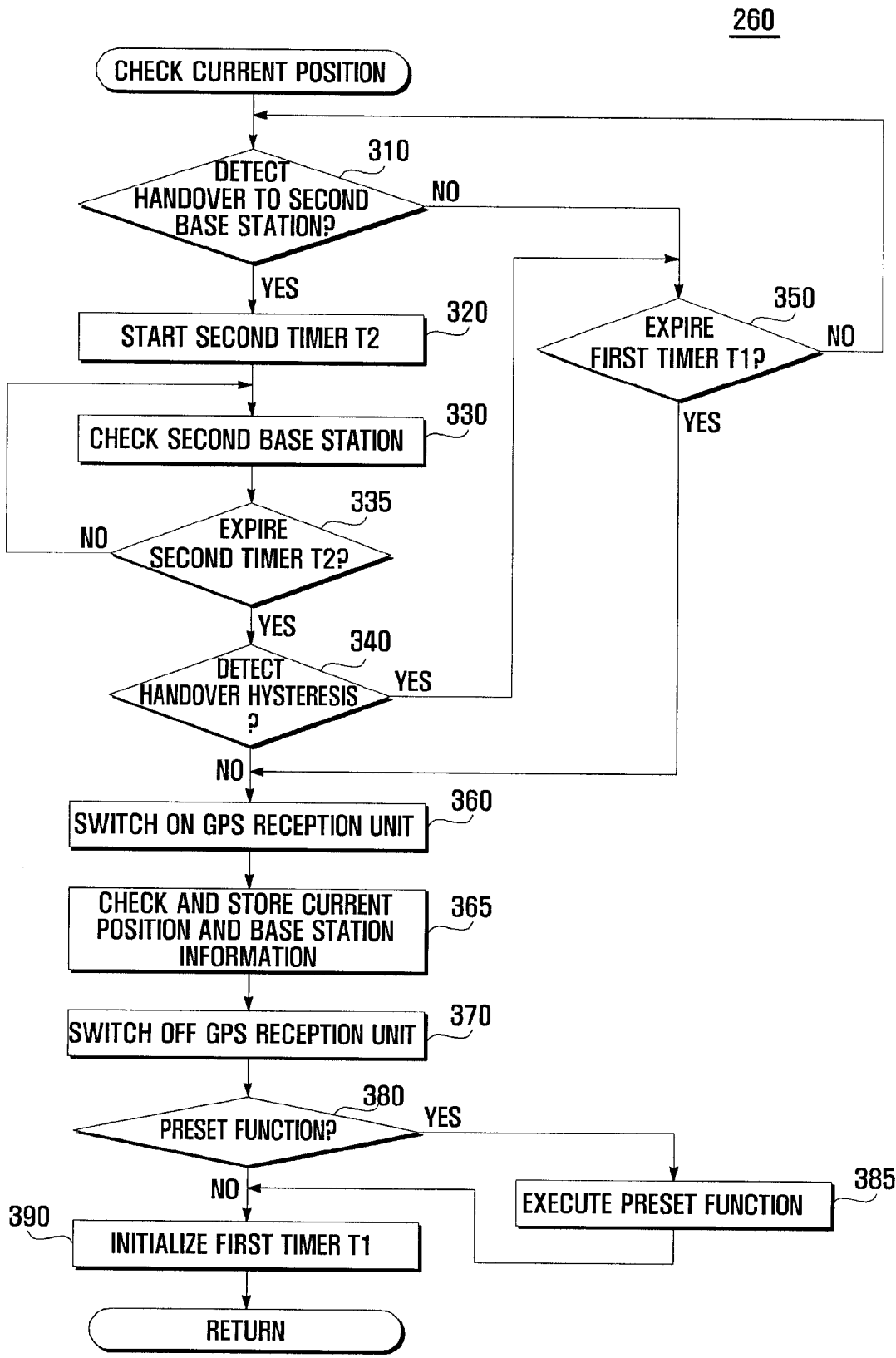
FIG. 3 is a flowchart illustrating exemplary operational steps of a position information update procedure of the current position location method of FIG. 2.

FIG. 2 is a flowchart illustrating exemplary operational of current position locating method for a mobile terminal having a GPS reception unit according to an exemplary embodiment of the present invention, and FIG. 3 is a flowchart illustrating a position information update procedure of the current position location method of FIG. 2.

Referring now to FIG. 2, if a current position check mode is requested by means of a menu selection or function key input, the control unit 130 controls the mobile terminal to enter the current position check mode (210). The current position check mode includes a periodic location function in which the mobile terminal checks its position periodically and sends the current position information to a designated phone number and a SOS function in which a text message containing the current position information is transmitted to a designated phone number in case of an emergency.

In the current position check mode, the control unit 130 switches on the GPS reception unit 120 to receive GPS data (220). Next, the control unit 130 calculates the current position of the mobile terminal based on the GPS data received by the GPS reception unit 120 and receives the base station information from the first base station by means of the RF unit 110 (230). At this time, the first base station is the serving base station which the mobile terminal is connected. The current position information and the base station information acquired at step 230 are stored within the storage unit 140.

Once the current position information and the base station information are acquired successfully, the control unit 130 switches off the GPS reception unit 120 (240) and starts the first timer T1 to turn on the GPS reception unit 120 periodically to update the current position information (250). Consequently, the control unit 130 updates the current position information based on the GPS data received periodically by means of the GPS reception unit 120 and the detection of handover to another base station (260). At (270), there is a decision to either end (terminate) the current position check mode, which is made after a handover, or to update the current position again at step (260). The current position information update procedure (260) is described in more detail with reference to FIG. 3.

Referring now to FIG. 3, after starting the first timer T1, the control unit 130 monitors to detect a handover of the mobile terminal to a second base station (310). Whether the mobile terminal has made a handover is determined by comparing the currently received base station information with the previously-stored base station information to see if there is a match.

Typically, a base station has the coverage from about a few hundred meters to a few kilometers. Accordingly, when the mobile terminal moves from the coverage of the first base station to the coverage of the second base station, it hands over the connection from the first base station to the second base station. The control unit 130 determines whether to hand over to the second base station on the basis of the received signal strengths of the first and second base stations and the Round Trip Times (RTTs) of packets to the first and second base stations.

At step 310, when a handover to the second base station is detected, the control unit 130 starts the second timer T2 and receives the base station information from the second base station. Next, the control unit 130 determines whether the second timer T2 has expired. If the second timer T2 has expired, this means that the mobile terminal has successfully completed the handover.

However, if no handover is detected at step 310, the control unit 130 determines whether or not the first timer T1 has expired (350).

Otherwise, if a handover to the second base station is detected, the control unit 130 starts the second timer T2 (320). Next, the control unit 130 receives the base station information from the second base station by means of the RF unit 110 and stores the base station information temporarily (330). Next, the control unit 130 determines whether the second timer T2 has expired (335). The control unit 130 checks the second base station until the second timer T2 expires. At this time, the control unit 130 also can monitor to detect the first timer T1 as well as the second timer T2. In case that the first timer T1 has expired before the expiry of the second timer T2, the GPS reception unit 120 switches on and thus the control unit 130 calculates the current position of the mobile terminal based on the GPS data received currently by the GPS reception unit 120 and initializes the first timer T1. At this time, the control unit 130 can initialize second timer T2 that are currently running and monitors to detect a handover.

Still referring to FIG. 3, if the second timer T2 has expired at step 335, the control unit 130 then determines whether the mobile terminal has made a handover back to the first base station (i.e. if the handover hysteresis has occurred) (340). Here, the control unit 130 receives the base station information by means of the RF unit 110 and determines whether the base station information received currently is identical with the previously-stored base station information. If the currently received base station information is identical with the previously-stored base station information, this means that the mobile terminal has made a handover back to the first base station. If it is determined that the mobile terminal has made a handover back to the first base station, the control unit 130 determines whether the first timer T1 has expired (350). If the first timer T1 has expired, the control unit 130 switches on the GPS reception unit 120 (360).

Otherwise, if the mobile terminal has not made a handover back to the first base station (i.e. if the handover to the second base station has made successfully i.e. without hysteresis) at step 340, the control unit 130 switches on the GPS reception unit 120 (360). Next, the control unit 130 acquires the current position information of the mobile terminal based on the GPS data that are currently received by the GPS reception unit 120 and updates the current position information and base station information stored in the storage unit 140 to the most recently acquired current position information and the temporarily stored base station information (365).

Next, at (370) the control unit 130 switches off the GPS reception unit 120 and determines whether or not a specific function is preset to be executed after the update of the current position information (380). If a specific function is set to be executed, the control unit 130 executes the preset function (385).

For example, if a current position report function is preset, the control unit 130 controls such that the updated current position information is sent to a designated phone number after the update current position information has been stored within the storage unit 140. Also, if a current position display function is preset, the control unit 130 controls such that the updated current position information is displayed on the display unit 150 periodically. After executing the preset function, the control unit 130 initializes the first timer T1 (390) and then determines whether a current position check mode termination command is input (270) (see FIG. 2).

If no specific function is set to be executed at step 380, the control unit 130 skips step 385 and initializes the first timer T1 (S390). That is, after the update of the current position of the mobile terminal with or without execution of following preset function and then determines whether a current position check mode termination command is input (270).

Returning now to FIG. 2, if no current position check mode termination command is input at step 270, the procedure goes to step 260. The control unit 130 updates the current position information of the mobile terminal based on the GPS data received by the GPS reception unit 120 at an interval of T1. However, in case that a handover is detected while the first timer T1 is running, the control unit 130 updates the current position information immediately regardless of the expiration status of the first timer T1 and then initializes the first timer T1. When the handover is detected, the control unit 130 monitors to detect whether or not the mobile terminal makes a handover back to the first base station in a predetermined time (i.e. whether a handover hysteresis occurs). If the mobile terminal does not make a handover back to the first base station (i.e. if the handover to the second base station is successfully made without handover hysteresis), the control unit 130 switches on the GPS reception unit 12 immediately to received the GPS data and calculates the current position based on the currently received GPS data. Consequently, the control unit 130 updates the current position information and the base station information stored in the storage unit 140 to the newly acquired current position information and base station information.

Although it is described that the current position information is transmitted to a designated phone number after update based on the expires of the first and second timers T1 and T2 and the detection of handover, the current position information stored in the storage unit 140 can be transmitted to the designated phone number in the form of a text message immediately when an SOS function is executed in an emergency. Also, the mobile terminal can be configured such that the control unit 130 switches on the GPS reception unit 120 immediately and transmits the newly acquired current position information as soon as possible after transmitting the stored position information. At this time, the control unit 130 updates the previously stored position information to the newly acquired current position information and initializes the first timer T1.

As described above, the GPS-enabled mobile terminal and current position locating method of the present invention is advantageous to efficiently acquire the current position information by updating the previously-stored position information periodically in normal operation state and immediately when a handover is detected. Also, the GPS-enabled mobile terminal and the current position locating method of the present invention is advantageous to transmit the current position information to a designated phone number periodically. Also, the GPS-enabled mobile terminal and current position locating method of the present invention can reduce power consumption by periodically switching on the GPS reception unit so as to quickly update the current position information by switching on GPS reception unit immediately when the mobile terminal makes a handoff to another base station. Furthermore, the GPS-enabled mobile terminal and current position locating method of the present invention can further reduce the amount of power consumption by retaining handover-triggered power-on of the GPS reception module when a handover hysteresis occurs. Also, an artisan understands and appreciates that the claimed invention is not limited to a particular version of GPS, and that other types of positioning systems that are compatible with a portable terminal may also be used within the spirit of the invention and the scope of the appended claims.

Although exemplary embodiments of the present invention have been described in detail hereinabove, it should be clearly understood that many variations and/or modifications of the basic inventive concepts herein taught which may appear to those skilled in the present art will still fall within the spirit of the present invention, and the scope of the appended claims.

What is claimed is:

1. A method for locating a position of a mobile terminal having a Global Positioning System (GPS) reception unit, comprising:
   receiving GPS data by the GPS reception unit comprising location information for producing a current position information of the mobile terminal;
   calculating by the control unit, a current position information of the mobile terminal using the GPS data;
   storing by the control unit the current position information of the mobile terminal;
   switching off the GPS reception unit after calculating the current position information of the mobile terminal;
   storing by the control unit a base station information received from a first base station to which the mobile terminal is connected with and starting a first timer;
   starting a second timer, when a handover to a second base station is detected;
   switching on by the control unit the GPS reception unit to update the current position information, when an expiration of the second timer is detected; and
   initializing the first timer simultaneously upon the expiration of the second timer.

2. The method of claim 1, wherein switching on the GPS reception unit comprises:
   determining whether or not a handover hysteresis is detected;
   switching on the GPS reception unit if no handover hysteresis is detected and updating the current position information to a new current position information acquired from the GPS data that are currently received by the GPS reception unit; and
   updating the base station information that was previously received from the first base station to a base station information received from the second base station.

3. The method of claim 2, wherein switching on the GPS reception unit further comprises:
   determining whether an expiration of the first timer is detected if a handover hysteresis is detected;
   switching on the GPS reception unit if a expiration of the first timer is detected and updating the current position information to a new current position information acquired from the GPS data that are currently received by the GPS reception unit; and
   initializing the first timer.

4. The method of claim 1, further comprising:
   determining whether or not an expiration of the first timer is detected;
   updating the current position information and the base station information; and
   initializing the first timer.

5. The method of claim 1, further comprising transmitting a message containing the current position information of the mobile terminal to a designated phone number.

6. The method of claim 1, further comprising transmitting a message to the designated phone number in the form of a text message immediately when an SOS function is executed in an emergency.

7. The method of claim 1, wherein after the control unit switches off the GPS reception unit, the control unit determining whether a specific function is preset for execution after the update of the current position information, and if the specific function is set to be executed, the control unit executing the preset function.

8. The method of claim 7, wherein if the control unit determines there is no specific function preset for being executed, the control unit proceeds to said initialization of the first timer simultaneously upon the expiration of the second timer.

9. A mobile terminal comprising:
   a Global Positioning System (GPS) reception unit for receiving GPS data comprising location information for determining a current position information of the mobile terminal;
   a control unit which in association with a first timer switches on the GPS reception unit periodically to update the current position information of the mobile terminal;
   a second timer which starts when a handover of the mobile terminal is detected;
   a radio frequency unit for receiving a base station information from a first base station to which the mobile terminal is connected; and
   wherein said control unit calculates the current position information using the location information from the GPS data received by means of the GPS reception unit, checks the base station information received by means of the radio frequency unit, initializes the first timer periodically, starts the second timer when a handover is detected, and switches on the GPS reception unit to update the current position information of the mobile terminal and initializes the first timer when the second timer expires.

10. The mobile terminal of claim 9, wherein the control unit determines, when an expiration of the second timer is detected, whether or not a handover hysteresis is detected, and switches on the GPS reception unit, if no handover hysteresis is detected, to update the current position information of the mobile terminal.

11. The mobile terminal of claim 10, wherein the control unit determines, if a handover hysteresis is detected, whether the first timer has expired and switches on the GPS reception unit, if the first timer has expired, to update the current position information of the mobile terminal.

12. The mobile terminal of claim 9, wherein the control unit updates, when the first timer has expired, the base station information with a most recently received base station information by means of the radio frequency unit.

13. The mobile terminal of claim 9, wherein the control unit transmits a message containing the updated current position information to a designated phone number.

14. The mobile terminal of claim 13, wherein the control unit transmits the message to the designated phone number in the form of a text message immediately when an SOS function is executed in an emergency.

* * * * *